(12) United States Patent
Scheer et al.

(10) Patent No.: US 7,666,116 B2
(45) Date of Patent: Feb. 23, 2010

(54) METHOD AND APPARATUS FOR DIFFERENTIAL LOCK CONTROL

(75) Inventors: Glenn O. Scheer, Durango, IA (US); Jeffrey D. Miller, Peosta, IA (US); Bruce A. Musmaker, Asbury, IA (US)

(73) Assignee: Deere & Company, Moline, IL (US)

( * ) Notice: Subject to any disclaimer, the term of this patent is extended or adjusted under 35 U.S.C. 154(b) by 402 days.

(21) Appl. No.: 11/541,839

(22) Filed: Oct. 2, 2006

(65) Prior Publication Data

US 2008/0081731 A1 Apr. 3, 2008

(51) Int. Cl.
*G06F 7/00* (2006.01)
*G06F 17/00* (2006.01)
*B60W 10/04* (2006.01)
*B60W 10/10* (2006.01)

(52) U.S. Cl. .......................... 477/35; 701/82
(58) Field of Classification Search .................. 477/35; 701/82
See application file for complete search history.

(56) References Cited

U.S. PATENT DOCUMENTS

| | | | |
|---|---|---|---|
| 4,523,494 A | 6/1985 | Sparks et al. | |
| 4,549,448 A | 10/1985 | Kittle | |
| 4,559,847 A | 12/1985 | Newendorp et al. | |
| 4,570,509 A | 2/1986 | Nighswonger | |
| 4,867,010 A | 9/1989 | Stettler, Jr. | |
| 5,026,335 A | 6/1991 | Oftedal et al. | |
| 6,174,255 B1 | 1/2001 | Porter et al. | |
| 6,640,850 B1 | 11/2003 | Hicks | |
| 7,276,015 B2 * | 10/2007 | Stervik | 477/110 |
| 2002/0070066 A1 | 6/2002 | Nakamura | |
| 2008/0076630 A1 * | 3/2008 | Fayyad et al. | 477/35 |

FOREIGN PATENT DOCUMENTS

JP  2000 064870 A  2/2000
WO  93/01065 A1  1/1993

OTHER PUBLICATIONS

Communication From European Patent Office (7 pages) (Jan. 25, 2008).
English Abstract for JP 2000 064870A (1 page).

* cited by examiner

*Primary Examiner*—Tisha D Lewis

(57) ABSTRACT

Method and differential-lock control apparatus for differential lock control are disclosed. A control unit is arranged for communication with an engine speed sensor, a differential-lock activation control, and a differential lock. The control unit is adapted to allow for reduction of an engine speed to a desired engine speed if the engine speed is at least a threshold engine speed in response to receipt of an activate-differential-lock request signal, and adapted to subsequently output an activate-differential-lock control signal to the differential lock so as to command activation of the differential lock.

13 Claims, 5 Drawing Sheets ial lock.

METHOD AND APPARATUS FOR DIFFERENTIAL LOCK CONTROL

FIELD OF THE DISCLOSURE

The present disclosure relates to control of a differential lock.

BACKGROUND OF THE DISCLOSURE

A differential may be used on a vehicle to transmit power to the wheels while allowing them to rotate at different speeds. A differential lock may be associated with the differential such that, when activated, the differential lock disallows the wheels to rotate at different speeds in order to prevent spinning of the wheels due to traction loss. A differential-lock activation switch onboard the vehicle may be switched on by the vehicle operator to activate the differential lock. However, activation of the differential lock when the wheels are rotating at significantly different speeds may compromise the differential.

SUMMARY OF THE DISCLOSURE

According to the present disclosure, there is provided a differential-lock control apparatus. The differential-lock control apparatus comprises an engine speed sensor, a differential-lock activation control, a differential lock, and a control unit arranged for communication with the engine speed sensor, the differential-lock activation control, and the differential lock. The control unit is adapted to: monitor output of the engine speed sensor for an engine speed signal and output of the differential-lock activation control for an activate-differential-lock request signal, determine from the engine speed signal if an actual engine speed is at least a threshold engine speed in response to receipt of the activate-differential-lock request signal, allow for reduction of the actual engine speed to a desired engine speed if the actual engine speed is at least the threshold engine speed in response to receipt of the activate-differential-lock request signal, and subsequently output an activate-differential-lock control signal to the differential lock so as to command activation of the differential lock.

Reduction of the actual engine speed before activation of the differential lock is useful for reducing what may otherwise be a potentially differential-damaging difference in wheel speeds. As such, the control unit is configured so as to promote the integrity and longevity of the differential. With this system, an operator would not need to remember to slow or stop the vehicle before activating the differential lock. An associated method is disclosed.

In a first embodiment, the control unit commands reduction of the actual engine speed if the actual engine speed is at least as great as the threshold engine speed when the differential-lock activation control is actuated. The control unit does so by outputting a desired-engine-speed control signal so as to cause the engine to reduce its speed to the desired engine speed, which is, for example, below the threshold engine speed. The control unit outputs this signal for a predetermined period of time, this time period being sufficient for reduction of the actual engine speed to the desired engine speed. Upon elapse of the predetermined period of time, the control unit outputs the activate-differential-lock control signal activating the differential lock so as to lock the differential ceasing any relative rotation between the wheels so that rotation of the wheels will be in unison. Thereafter, the control unit may operate so as to increase the actual engine speed to the requested engine speed.

In a second embodiment, if the actual engine speed is at least as great as the threshold engine speed when the differential-lock activation control is actuated, the control unit outputs an activate-alarm control signal activating an alarm so as to indicate to the vehicle operator that the actual engine speed is at least as great as the threshold engine speed. The control unit then waits for the operator to reduce the actual engine speed. While waiting, it continues to monitor the actual engine speed and determines if the actual engine speed has reduced to the desired engine speed. If the control unit determines that the actual engine speed has reduced to the desired engine speed, the control unit outputs the activate-differential-lock control signal activating the differential lock so as to lock the differential ceasing any relative rotation between the wheels so that rotation of the wheels will be in unison.

The above and other features will become apparent from the following description and the attached drawings.

BRIEF DESCRIPTION OF THE DRAWINGS

The detailed description of the drawings refers to the accompanying figures in which.

DETAILED DESCRIPTION OF THE DRAWINGS

Figure 1:
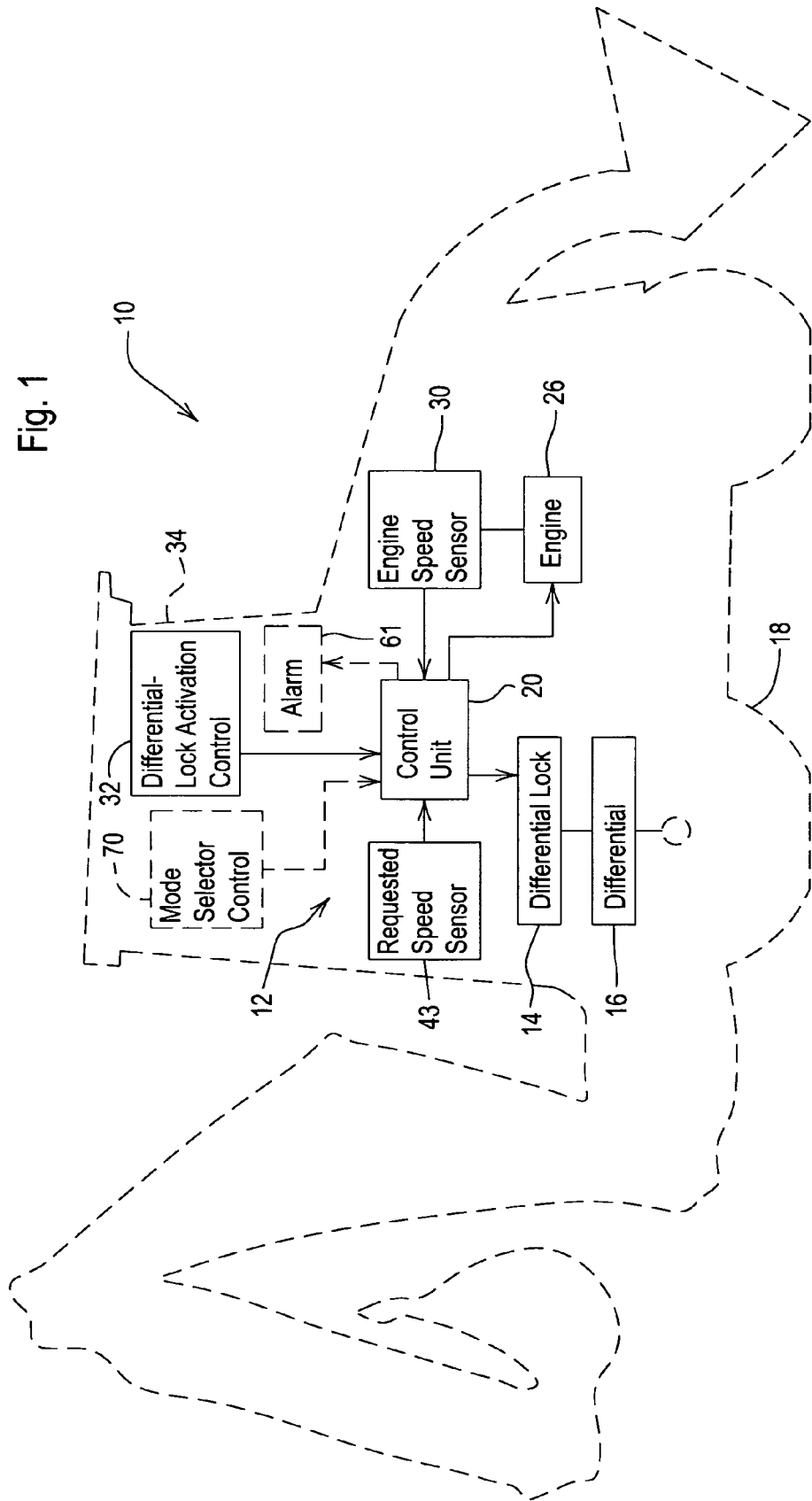
FIG. 1 is a side elevational view of a work vehicle embodied, for example, as a backhoe loader.
Figure 2:
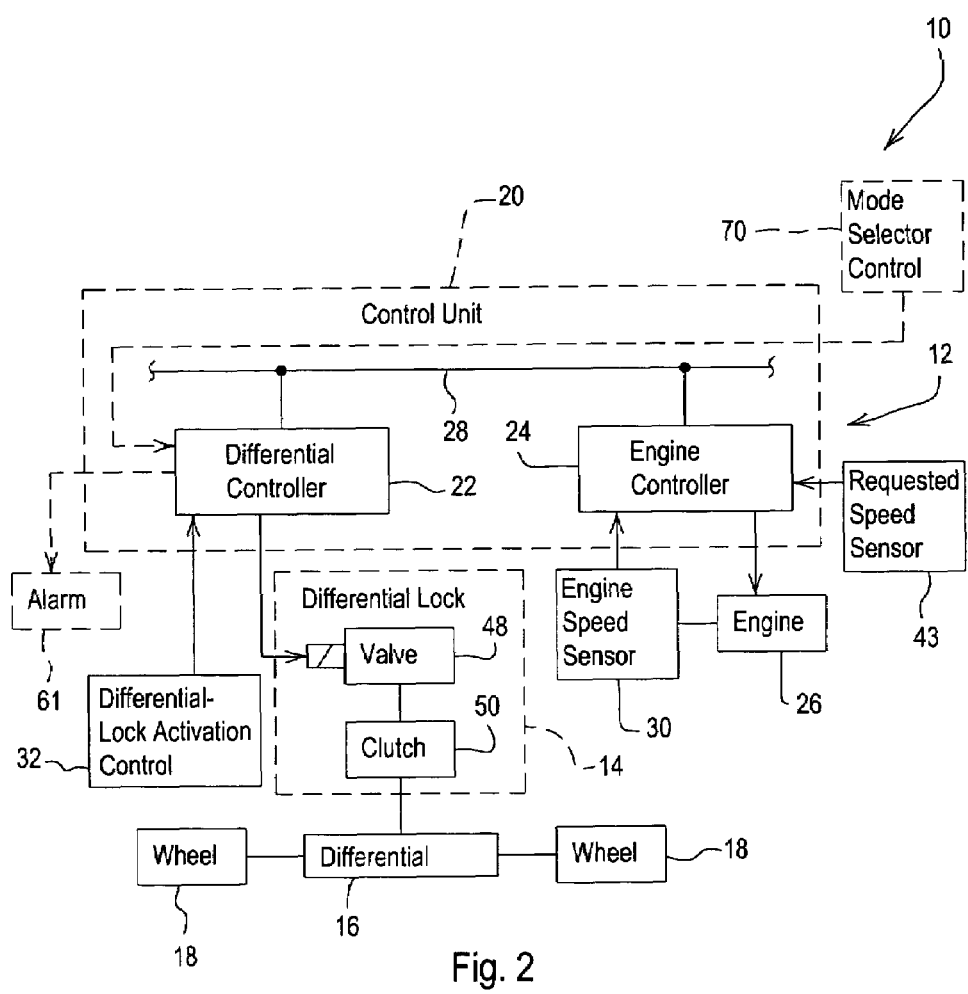
FIG. 2 is a diagrammatic view showing a control unit for controlling a differential lock of a work vehicle.

Referring to FIGS. 1 and 2, there is shown a vehicle 10 with a differential-lock control apparatus 12 comprising a differential lock 14 for locking a differential 16 so as to prevent rotation of wheels 18 coupled to the differential 16 at different speeds. The differential-lock control apparatus 12 is particularly useful with a wide variety of work vehicles such as, for example, the backhoe loader of FIG. 1. The apparatus 12 is configured to promote the integrity and longevity of the differential 16 should the vehicle operator attempt to activate the differential lock 14 when the wheels 18 are rotating at significantly different speeds.

The apparatus 12 has a control unit 20 for controlling activation of the differential lock 14. The control unit 20 is an electronic unit which may comprise one or more controllers. Illustratively, the control unit 20 has at least two electronic controllers, a differential controller 22 responsible for control of the differential lock 14 and an engine controller 24 responsible for control of an engine 26, connected by a communication bus 28. It is to be understood that the differential controller 22 and the engine controller 24 may be integrated as a single electronic controller. In either case, the control unit has a processor and a memory having stored therein instructions, which when executed by the processor, cause the processor to the perform the various operations of the control unit 20, such as, for example, either or both of the control routines shown in FIGS. 3 and 4 and discussed below.

The control unit 20 is arranged for communication with an engine speed sensor 30, a differential-lock activation control 32, and the differential lock 14. The engine speed sensor 30 senses the actual engine speed ("AES" in drawings) of the engine 26 and outputs an engine speed signal representative of the actual engine speed to the control unit 20 or component thereof (e.g., the engine controller 24). Exemplarily, the engine speed sensor 30 senses the rotation speed (e.g., revolutions per minute—rpm) of the crankshaft of the engine. The differential-lock activation control 32 may be, for example, an on/off switch located in a cab 34 of the vehicle 10 for actuation by the vehicle operator to request activation of the differential lock 14. The control 32 outputs an activate-differential-lock request signal to the control unit 20 or component thereof (e.g., the differential controller 22) upon such actuation of the control 32 by the operator.

Generally speaking, the control unit 20 is adapted to: monitor output of the engine speed sensor 30 for the engine speed signal and output of the differential-lock activation control 32 for the activate-differential-lock request signal, determine from the engine speed signal if the actual engine speed is at least a threshold engine speed ("TES" in drawings) (e.g., 1500 rpm) in response to receipt of the activate-differential-lock request signal, allow for reduction of the actual engine speed to a desired engine speed ("DES" in drawings) (e.g., 1490 rpm) if the actual engine speed is at least the threshold engine speed in response to receipt of the activate-differential-lock request signal, and subsequently output an activate-differential-lock control signal to the differential lock 14 so as to command activation of the differential lock 14.

The threshold engine speed is selected based on its ability to cause a wheel 18 coupled to the differential 16 to slip (i.e., break traction with the underlying surface). Engine speeds at or exceeding the threshold engine speed are more likely to cause a wheel 18 to slip than engine speeds less than the threshold engine speed. When wheel slippage occurs, greater differences in wheel speeds between wheels 18 coupled to the differential 16 are more likely to occur, increasing the risk of differential damage upon differential lock activation. As such, the threshold engine speed is considered an adequate measure of whether to allow reduction of the actual engine speed to a desired engine speed, and thus reduction of the torque transfer through the drive train, before activation of the differential lock 14 upon actuation of the control 32.

Figure 3:
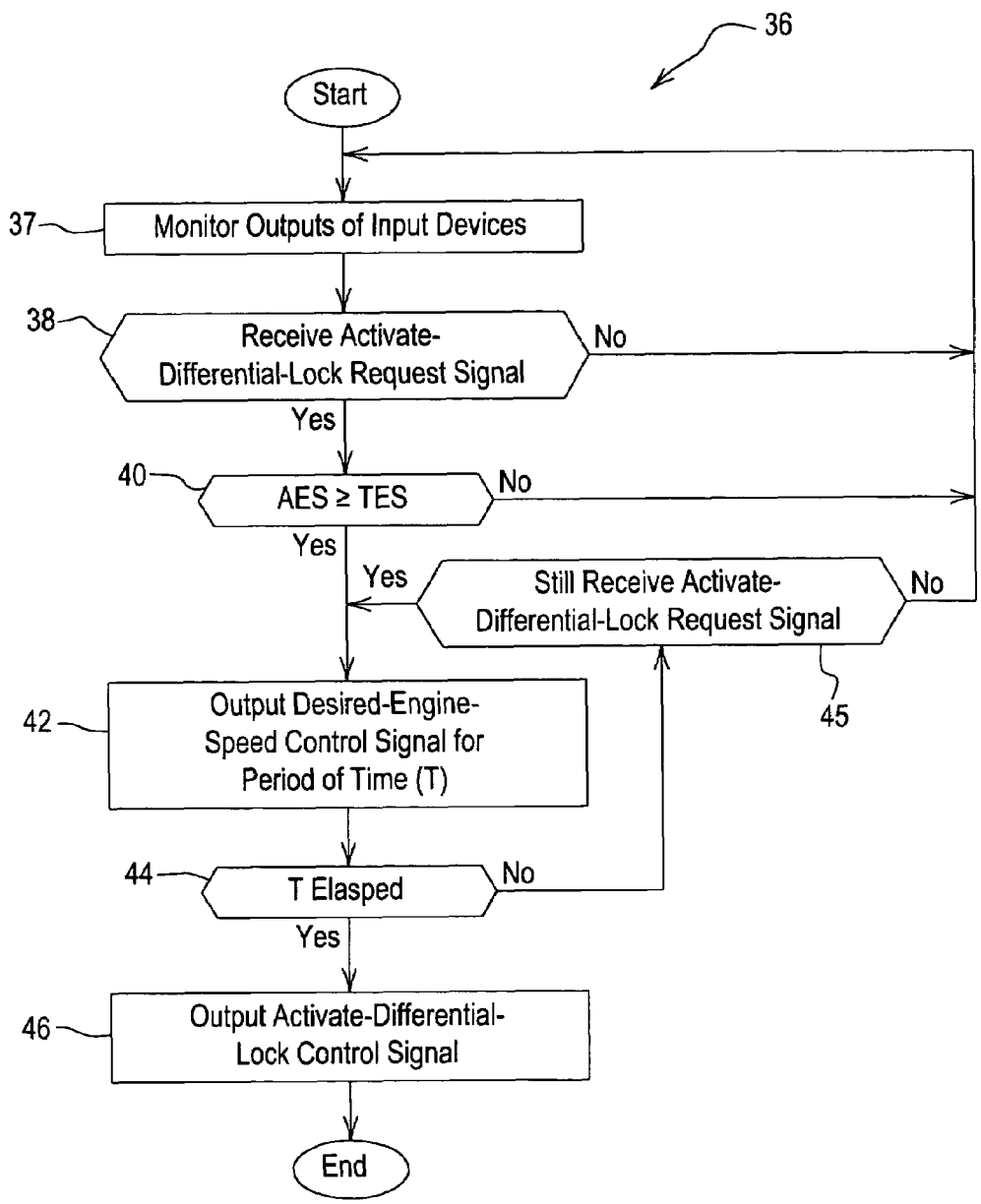
FIG. 3 is a first control routine for use with the control unit of FIG. 2.
Figure 4:
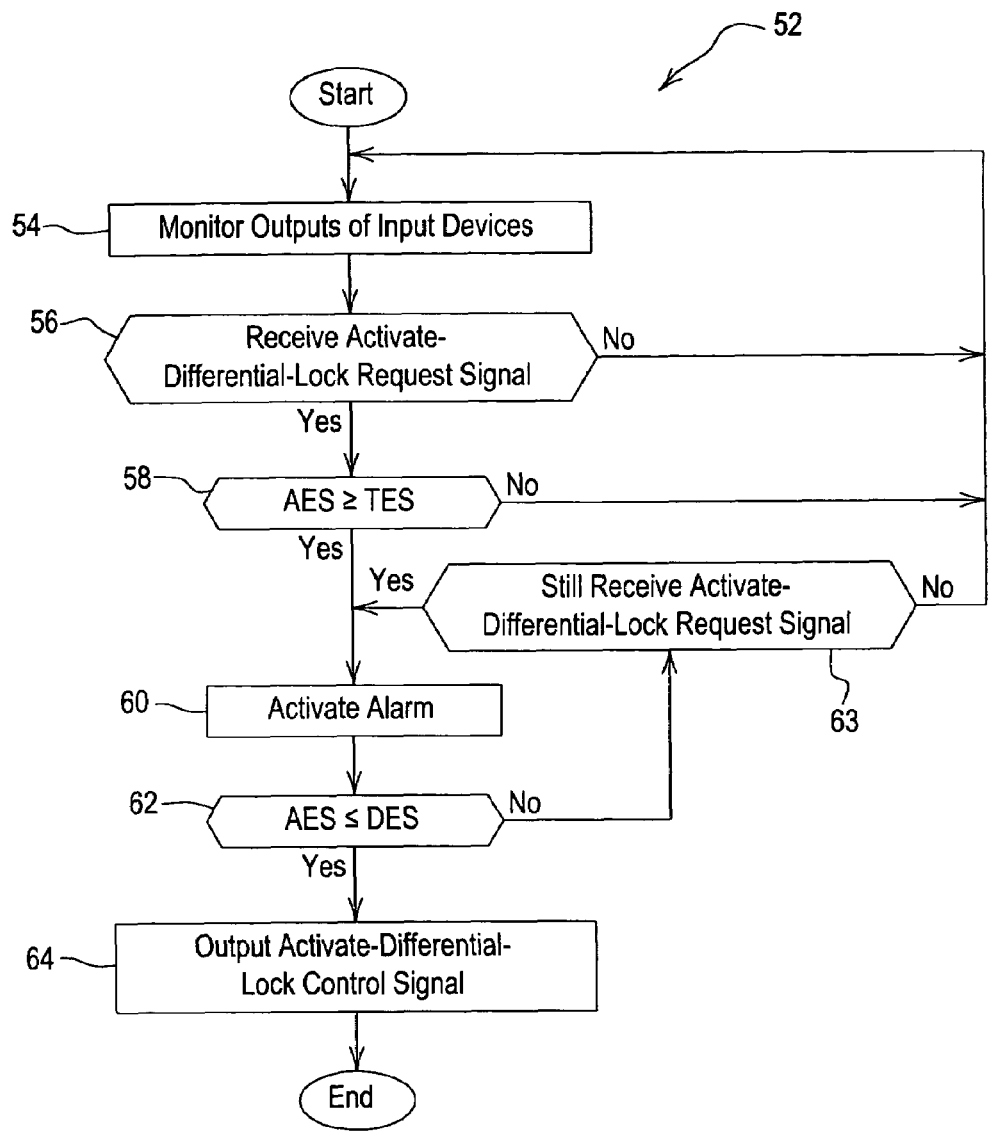
FIG. 4 is a second control routine for use with the control unit of FIG. 2.

As mentioned above, the control unit 20 may be programmed to operate according to the control routine of either FIG. 3 or FIG. 4. Each control routine is discussed in turn.

Referring to FIG. 3, there is shown control routine 36 which may be incorporated into the control unit 20. The control routine 36 includes automatic speed control of the actual engine speed.

In act 37 of the control routine 36, the control unit 20 monitors output of the engine speed sensor 30 for the engine speed signal. It also monitors output of the differential-lock activation control 32 for the activate-differential-lock request signal.

In act 38, the control unit 20 determines whether it has received the activate-differential-lock request signal due to actuation of the control 32, representing that the operator has requested activation of the differential lock 14. If no, the control unit 20 continues to monitor output of the control 32 for the request signal and output of the engine speed sensor 30 for the engine speed signal in act 37. If yes, the control routine 36 advances to act 40.

In act 40, the control unit 20 determines from the engine speed signal if the actual engine speed ("AES") is at least the threshold engine speed ("TES") in response to receipt of the activate-differential-lock request signal. If no, the control unit 20 continues to monitor output of the control 32 for the request signal and output of the engine speed sensor 30 for the engine speed signal in act 37. If yes, the control routine 36 advances to act 42.

In act 42, the control unit 20 allows for reduction of the actual engine speed to a desired engine speed. It does so in control routine 36 by outputting a desired-engine-speed control signal commanding reduction of the actual engine speed to the desired engine speed, automatically effecting engine speed control. Exemplarily, the desired-engine-speed control signal is outputted to the engine 26 so as to control fuel flow into the combustion chamber(s) thereof. As such, the desired-engine-speed control signal may be sent to the fuel injector(s) to control the amount of fuel injected.

During output of the desired-engine-speed control signal, the control unit 20 overrides a requested engine speed requested by the operator with the desired engine speed so as to command engine operation at the desired engine speed instead of the requested engine speed. The control unit 20 monitors output of a requested speed sensor 43 (e.g., accelerator foot pedal position sensor or throttle position sensor) for a requested-engine-speed signal representative of the requested engine speed. The control unit 20, in effect, ignores the requested-engine-speed signal during outputting of the desired-engine-speed control signal.

The desired-engine-speed control signal is outputted by the control unit 20 for a predetermined period of time ("T" in the drawings). The duration of the predetermined period of time is established to allow sufficient time for the actual engine speed to reduce to the desired engine speed which is, for example, less than the threshold engine speed. As such, the predetermined period of time may be determined by the control unit 20 based on the actual engine speed at the time of actuation of the control 32 by the operator, larger actual engine speeds resulting in larger time periods and smaller actual engine speeds resulting in smaller time periods. The control unit 20 may thus have a look-up table, equation, or other criteria stored in the memory thereof to determine the duration of the predetermined period of time.

In act 44, the control unit 20 determines if the predetermined period of time has elapsed. If no, the control routine 36 advances to act 45. If yes, the control routine 36 advances to act 46.

In act 45, the control unit 20 confirms if the activate-differential-lock request is still present. In particular, the control unit 20 determines if it is still receiving the activate-differential-lock request signal. If yes, the control routine 36 advances to act 42, in which the control unit 20 continues to output the desired-engine-speed control signal. If no, the control routine 36 returns to act 37. This covers the situation where the operator requests activation of the differential lock 14 when the actual engine speed is at least the threshold engine speed but then ceases the request for activation of the differential lock 14 before elapse of the predetermined period of time.

In act 46, the control unit 20 outputs the activate-differential-lock control signal upon elapse of the predetermined period of time. This control signal commands activation of the differential lock 14. Exemplarily, it does so by operating the solenoid portion of an electro-hydraulic valve 48 of the differential lock 14 so that hydraulic fluid is directed by the valve 48 to a differential lock clutch 50 (e.g., dog clutch) of the lock 14 to cause the clutch 50 to engage the differential 16 to cease relative rotation between the wheels 18.

At some point thereafter, the control unit 20 ceases to override the requested engine speed with the desired engine speed, allowing the actual engine speed to increase from the desired engine speed to the requested engine speed. This may be programmed into the control unit 20 so as to occur subsequent to activation of the differential lock 14 either while the control 32 is actuated or upon de-actuation of the control 32.

In the case where the control unit 20 has separate controllers 22 and 24, the differential controller 22 monitors the output of the control 32 and the engine controller 24 monitors the output of the engine speed sensor 30. The engine controller 24 sends the actual engine speed to the differential controller 22 via the communication bus 28. The differential controller 22 performs acts 38 and 40 and, in act 42, outputs a signal representative of the desired engine speed to the engine controller 24 via the communication bus 28. The engine controller 24 then outputs the desired-engine-speed control signal to the engine 26. The differential controller 22 also performs the acts 44 and 46.

Referring to FIG. 4, there is shown control routine 52 which may be incorporated into the control unit 20 alternatively to, or in addition to, control routine 36. The control routine 52 includes manual speed control of the actual engine speed.

In act 54 of the control routine 52, the control unit 20 monitors output of the engine speed sensor 30 for the engine speed signal. It also monitors output of the differential-lock activation control 32 for the activate-differential-lock request signal.

In act 56, the control unit 20 determines whether it has received the activate-differential-lock request signal due to actuation of the control 32, representing that the operator has requested activation of the differential lock 14. If no, the control unit 20 continues to monitor output of the control 32 for the request signal and output of the engine speed sensor 30 for the engine speed signal in act 54. If yes, the control routine 52 advances to act 58.

In act 58, the control unit 20 determines from the engine speed signal if the actual engine speed ("AES") is at least the threshold engine speed ("TES") in response to receipt of the activate-differential-lock request signal. If no, the control unit 20 continues to monitor output of the control 32 for the request signal and output of the engine speed sensor 30 for the engine speed signal in act 54. If yes, the control routine 52 advances to act 60.

In act 60, the control unit 20 allows for reduction of the actual engine speed to a desired engine speed. It does so in control routine 52 by outputting an activate-alarm control signal commanding activation of an alarm 61 (e.g., audible, visual) in the cab 34 so as to indicate to the operator that the actual engine speed is at least as great as the threshold engine speed while waiting for manual reduction of the actual engine speed to the desired engine speed by the operator.

In act 62, while waiting, the control unit 20 monitors output of the engine speed sensor 30 for the engine speed signal. It determines from the engine speed signal if the actual engine speed has reduced to the desired engine speed (i.e., if the actual engine speed is less than or equal to the desired engine speed) and outputs the activate-differential-lock control signal if the actual engine speed has reduced to the desired engine speed. If no, the control routine 52 advances to act 63. If yes, the control routine 52 advances to act 64.

In act 63, the control unit 20 confirms if the activate-differential-lock request is still present. In particular, the control unit 20 determines if it is still receiving the activate-differential-lock request signal. If yes, the control routine 52 advances to act 42, in which the control unit 20 continues to activate the alarm 61. If no, the control routine 52 returns to act 54. This covers the situation where the operator requests activation of the differential lock 14 when the actual engine speed is at least the threshold engine speed but then ceases the request for activation of the differential lock 14 before reduction of the actual engine speed to the desired engine speed.

In act 64, the control unit 20 outputs the activate-differential-lock control signal commanding activation of the differential lock 14. Exemplarily, it does so by operating the solenoid portion of the electro-hydraulic valve 48 so that hydraulic fluid is directed by the valve 48 to the clutch 50 to cause the clutch 50 to engage the differential 16 to cease relative rotation between the wheels 18.

In the case where the control unit 20 has separate controllers 22 and 24, the differential controller 22 monitors the output of the control 32 and the engine controller 24 monitors the output of the engine speed sensor 30. The engine controller 24 sends the actual engine speed to the differential controller 22 via the communication bus 28. The differential controller 22 performs acts 56, 58, 60, 62, and 64 while the engine controller 24 continues to control the actual engine speed in response to the requested-engine-speed signal generated in response to operation of the vehicle speed control by the operator.

Figure 5:
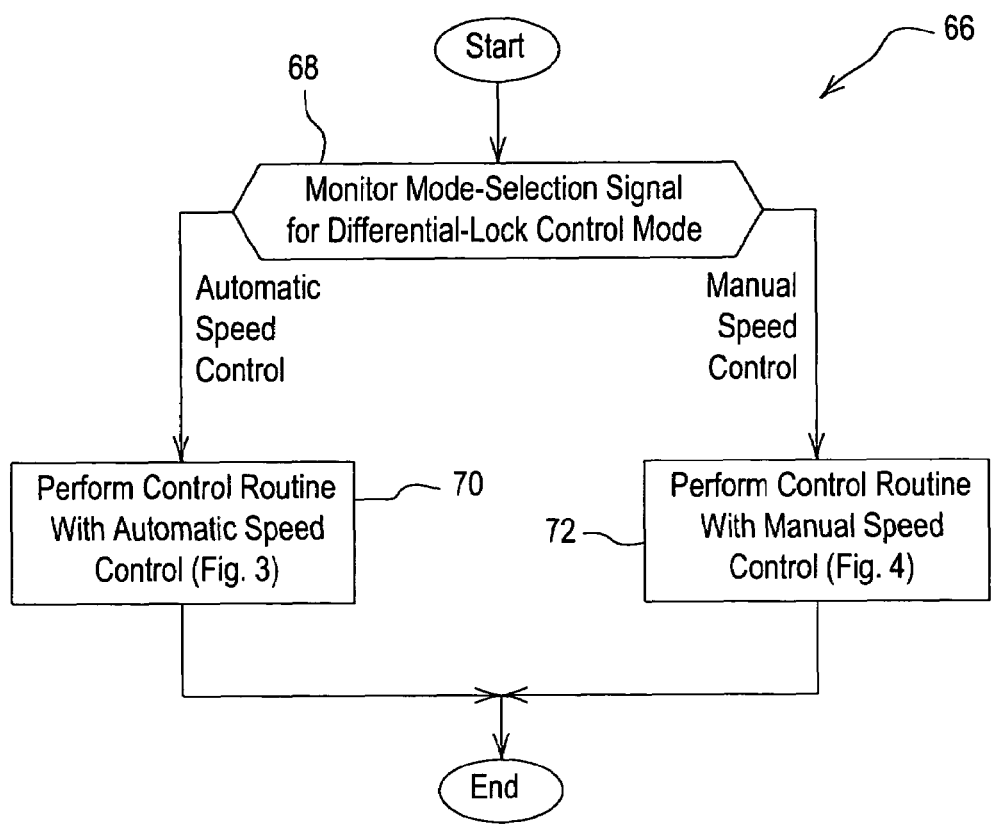
FIG. 5 is a control routine integrating the control routines of FIGS. 3 and 4 for operator selectability.

Referring to FIG. 5, there is shown a control routine 66 which may be programmed into the control unit 20. The control routine 66 allows the operator to select either control routine 36 with its automatic engine speed control feature or control routine 52 with its manual engine speed control feature by actuation of a mode selector control 70 located, for example, in the cab 34 (FIGS. 1 and 2).

In act 68 of the control routine 66, the control unit 20 monitors output of the mode selector control 70 (FIGS. 1 and 2) for a mode-selection signal representative of an operator selection between the different control modes for the differential lock, i.e., between the automatic engine speed control mode (control routine 36) or the manual engine speed control mode (control routine 52). If the automatic engine speed control mode is selected, the control routine 66 advances to act 70 in which the control unit 20 performs the control routine 36. If the manual engine speed control mode is selected, the control routine 66 advances to act 72 in which the control unit 20 performs the control routine 52. As such, the operator may select whichever differential-lock control mode is preferred.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. A differential-lock control apparatus, comprising:
an engine speed sensor,
a differential-lock activation control,
a differential lock, and
a control unit arranged for communication with the engine speed sensor, the differential-lock activation control, and the differential lock, the control unit adapted to:
monitor output of the engine speed sensor for an engine speed signal and output of the differential-lock activation control for an activate-differential-lock request signal, determine from the engine speed signal if an actual engine speed is at least a threshold engine speed in response to receipt of the activate-differential-lock request signal, allow for reduction of the actual engine speed to a desired engine speed if the actual engine speed is at least the threshold engine speed in response to receipt of the activate-differential-lock request signal, and subsequently output an activate-differential-lock control signal to the differential lock so as to command activation of the differential lock, wherein the control unit is adapted to output a desired-engine-speed control signal commanding reduction of the actual engine speed to the desired engine speed, the control unit is adapted to output the desired-engine-speed control signal for a predetermined period of time and adapted to output the activate-differential-lock control signal upon elapse of the predetermined period of time, and the control unit is adapted to determine the duration of the predetermined period of time based on the actual engine speed at the time of actuation of the differential-lock activation control by an operator.

2. The differential-lock control apparatus of claim 1, wherein the control unit is adapted to output the desired-engine-speed control signal such that the desired engine speed is less than the threshold engine speed.

3. The differential-lock control apparatus of claim 1, comprising a speed input device, wherein the control unit is adapted to monitor output of the speed input device for a requested engine speed signal representative of a requested engine speed, and adapted to override the requested engine speed with the desired engine speed so as to command engine operation at the desired engine speed instead of the requested engine speed.

4. A differential-lock control apparatus, comprising:
an operator alarm,
an engine speed sensor,
a differential-lock activation control,
a differential lock, and
a control unit arranged for communication with the engine speed sensor, the differential-lock activation control, and the differential lock, the control unit adapted to:
monitor output of the engine speed sensor for an engine speed signal and output of the differential-lock activation control for an activate-differential-lock request signal,
determine from the engine speed signal if an actual engine speed is at least a threshold engine speed in response to receipt of the activate-differential-lock request signal,
allow for reduction of the actual engine speed to a desired engine speed if the actual engine speed is at least the threshold engine speed in response to receipt of the activate-differential-lock request signal, and
subsequently output an activate-differential-lock control signal to the differential lock so as to command activation of the differential lock, wherein the control unit is adapted to determine if the actual engine speed has reduced to the desired engine speed and output the activate-differential-lock control signal if the actual engine speed has reduced to the desired engine speed, the control unit is adapted to output an activate-alarm control signal commanding activation of the operator alarm so as to indicate to the operator that the actual engine speed is at least as great as the threshold engine speed while waiting for manual reduction of the actual engine speed to the desired engine speed.

5. The differential-lock control apparatus of claim 1, comprising a mode selector control operable by an operator to select between different control modes for the differential lock, wherein the control unit is adapted to monitor output of the mode selector control for a mode-selection signal.

6. A method, comprising:
monitoring an engine speed signal and for an activate-differential-lock request signal,
determining from the engine speed signal if an actual engine speed is at least as great as a threshold engine speed in response to receipt of the activate-differential-lock request signal,
allowing for reduction of the actual engine speed to a desired engine speed if the actual engine speed is at least as great as the threshold engine speed in response to receipt of the activate-differential-lock request signal, and
subsequently outputting an activate-differential-lock control signal commanding activation of a differential lock,
wherein the allowing comprises outputting a desired-engine-speed control signal commanding reduction of the actual engine speed to the desired engine speed, outputting the desired-engine-speed control signal comprises outputting the desired-engine-speed control signal for a predetermined period of time, outputting the activate-differential-lock control signal comprises outputting the activate-differential-lock control signal upon elapse of the predetermined period of time, and the allowing comprises determining the duration of the predetermined period of time based on the actual engine speed at the time of actuation of a differential-lock activation control by an operator.

7. The method of claim 6, wherein outputting the desired-engine-speed control signal comprises outputting the desired-engine-speed control signal such that the desired engine speed is less than the threshold engine speed.

8. The method of claim 6, comprising monitoring a requested engine speed signal representative of a requested engine speed, wherein outputting the desired-engine-speed control signal comprises overriding the requested engine speed with the desired engine speed so as to command engine operation at the desired engine speed instead of the requested engine speed.

9. A method, comprising:
monitoring an engine speed signal and for an activate-differential-lock request signal,
determining from the engine speed signal if an actual engine speed is at least as great as a threshold engine speed in response to receipt of the activate-differential-lock request signal,
allowing for reduction of the actual engine speed to a desired engine speed if the actual engine speed is at least as great as the threshold engine speed in response to receipt of the activate-differential-lock request signal, and
subsequently outputting an activate-differential-lock control signal commanding activation of a differential lock,
wherein the allowing comprises determining if the actual engine speed has reduced to the desired engine speed, the outputting comprises outputting the activate-differential-lock control signal if the actual engine speed has reduced to the desired engine speed, and the allowing comprises outputting an activate-alarm control signal commanding activation of an operator alarm so as to indicate to the operator that the actual engine speed is at least as great as the threshold engine speed while waiting for manual reduction of the actual engine speed to the desired engine speed.

10. The method of claim 9, wherein the monitoring comprises monitoring output of an engine speed sensor for the engine speed signal and output of a differential-lock activation control for the activate-differential-lock request signal.

11. The method of claim 6, monitoring for a mode-selection signal representative of an operator selection between different control modes for the differential lock.

12. The differential-lock control apparatus of claim 4, comprising a mode selector control operable by an operator to select between different control modes for the differential lock, wherein the control unit is adapted to monitor output of the mode selector control for a mode-selection signal.

13. The method of claim 9, monitoring for a mode-selection signal representative of an operator selection between different control modes for the differential lock.

* * * * *